(12) United States Patent
Hou et al.

(10) Patent No.: US 12,309,890 B2
(45) Date of Patent: May 20, 2025

(54) HEATING STRUCTURE AND A HEATING DEVICE APPLYING IT

(71) Applicant: Tanjing Keji (Guangdong) Co. Ltd, Guangzhou (CN)

(72) Inventors: Bin Hou, Guangzhou (CN); Sheng Li, Guangzhou (CN); Bingang Tao, Guangzhou (CN)

(73) Assignee: Tanjing Keji (Guangdong) Co. Ltd, Guangzhou (CN)

( * ) Notice: Subject to any disclaimer, the term of this patent is extended or adjusted under 35 U.S.C. 154(b) by 0 days.

(21) Appl. No.: 18/731,660

(22) Filed: Jun. 3, 2024

(65) Prior Publication Data
US 2025/0048500 A1 Feb. 6, 2025

(30) Foreign Application Priority Data

Aug. 4, 2023 (CN) .......................... 202322087465.2

(51) Int. Cl.
*H05B 3/28* (2006.01)
*B32B 3/30* (2006.01)
(Continued)

(52) U.S. Cl.
CPC ................. *H05B 3/28* (2013.01); *B32B 3/30* (2013.01); *B32B 5/18* (2013.01); *B32B 15/02* (2013.01);
(Continued)

(58) Field of Classification Search
CPC .... H05B 3/28; H05B 3/146; H05B 2203/013; B32B 3/30; B32B 5/18; B32B 15/02;
(Continued)

(56) References Cited

U.S. PATENT DOCUMENTS

| 2010/0136276 A1* | 6/2010 | Andou | .................... B32B 27/38 |
| | | | 156/182 |
| 2012/0225254 A1* | 9/2012 | Wagai | .................. H03H 9/1014 |
| | | | 428/167 |

(Continued)

FOREIGN PATENT DOCUMENTS

| CN | 213395315 U | 6/2021 |
| CN | 213605878 U | 7/2021 |

(Continued)

*Primary Examiner* — Elizabeth M Kerr
*Assistant Examiner* — Keith Brian Assante
(74) *Attorney, Agent, or Firm* — JEEN IP LAW, LLC

(57) ABSTRACT

The utility model relates to the field of electric heating and heat conduction technology, specifically to a heating structure and the heating device applying it. The heating structure comprises surface layer sequentially stacked and connected, heat-conducting insulating layer, heating film and thermal insulation layer. The heat generating film comprises an electrically conductive layer, and electrically conductive members provided at two end portions of an upper surface of the electrically conductive layer. The heating structure has a high heating temperature, desirable heating uniformity, which can be connected to broad range of voltages. They can be used to adjust heating temperature, and the heating temperature can reach a maximum of 350° C. In addition, the heating structure has the advantages of thin thickness and small volume. The heating device can be used as grill pan, electric hot pot, iron, electric heater, industrial oven or tunnel oven.

11 Claims, 6 Drawing Sheets

(51) Int. Cl.
  *B32B 5/18* (2006.01)
  *B32B 15/02* (2006.01)
  *B32B 27/06* (2006.01)
  *B32B 27/18* (2006.01)
  *B32B 27/28* (2006.01)
  *H05B 3/14* (2006.01)

(52) U.S. Cl.
  CPC ............ *B32B 27/065* (2013.01); *B32B 27/18* (2013.01); *B32B 27/283* (2013.01); *H05B 3/146* (2013.01); *B32B 2264/108* (2013.01); *B32B 2266/126* (2016.11); *B32B 2307/202* (2013.01); *B32B 2307/302* (2013.01); *B32B 2307/304* (2013.01); *B32B 2307/7376* (2023.05); *H05B 2203/013* (2013.01)

(58) Field of Classification Search
  CPC ..... B32B 27/065; B32B 27/18; B32B 27/283; B32B 2266/126; B32B 2307/7376; B32B 2264/108; B32B 2307/202; B32B 2307/302; B32B 2307/304
  See application file for complete search history.

(56) References Cited

U.S. PATENT DOCUMENTS

| | | | |
|---|---|---|---|
| 2017/0150651 A1* | 5/2017 | Hartman | B32B 15/09 |
| 2018/0376536 A1* | 12/2018 | Goo | H05B 3/78 |
| 2019/0308591 A1* | 10/2019 | Salter | B32B 27/22 |
| 2020/0376929 A1* | 12/2020 | Lee | H05B 3/22 |
| 2021/0033556 A1* | 2/2021 | Muziol | C04B 35/581 |
| 2021/0179329 A1* | 6/2021 | Chaturvedi | B65D 65/406 |
| 2021/0345457 A1* | 11/2021 | Hori | H05B 3/16 |
| 2022/0136691 A1* | 5/2022 | Wheatley | B32B 17/10 219/220 |
| 2022/0167463 A1* | 5/2022 | Tanaka | H01C 7/00 |
| 2023/0130820 A1* | 4/2023 | Park | B29C 43/14 219/200 |
| 2023/0302764 A1* | 9/2023 | Taguchi | B32B 15/14 |
| 2024/0140361 A1* | 5/2024 | Sakai | H05B 3/84 |
| 2024/0372180 A1* | 11/2024 | Joos | B32B 5/02 |

FOREIGN PATENT DOCUMENTS

| | | |
|---|---|---|
| CN | 115604874 A | 1/2023 |
| CN | 220372401 U | 1/2024 |

* cited by examiner

HEATING STRUCTURE AND A HEATING DEVICE APPLYING IT

CROSS-REFERENCE TO RELATED APPLICATIONS

The application claims priority to Chinese patent application No. 2023220874652, filed on Aug. 4, 2023, the entire contents of which are incorporated herein by reference.

TECHNICAL FIELD

The utility model relates to the technical field of electric heating and heat conduction, specifically to a heating structure and a heating device applying it.

BACKGROUND

The electric heating and heat conduction technology has significant advantages such as clean energy-oriented, high heat conversion efficiency, and convenient laying design. It is widely used in modern household appliances, construction, heating engineering, and decoration and furnishing.

In current applications, the heating devices are mostly electric heating devices, and the electric heating devices are widely used in various fields. Common electric heating devices include baking pans, irons, electric heaters, industrial ovens, tunnel ovens and etc.

As for the existing technology, the common electric heating device described above is not able to achieve high heating temperature, with undesirable heating uniformity. They are generally only suitable for a fixed voltage of 220V, which is not adjustable to various voltages. Therefore, it is difficult to adjust the heating temperature of the electric heating device by changing the voltage. In addition, the existing common electric heating device is generally thicker and larger.

SUMMARY

In order to overcome the deficiencies of the existing technology, the first object of the present utility model is to provide a heating structure, which has the advantages of high heating temperature and desirable heating uniformity, being to be connected to a large range of voltages and adjustable regarding heating temperature, both thin and small in volume.

In order to overcome the deficiencies of the existing technology, a second object of the utility model is to provide a heating device.

In order to realize the above first object of the utility model, the technical solutions adopted in the utility model are as follows:

The utility model provides a heating structure comprising a surface layer, a heat-conducting insulating layer, a heat-generating film and a heat-insulating insulating layer connected in a sequential cascade; the surface layer, the heat-conducting insulating layer, the heat-generating film and the heat-insulating insulating layer can be connected by adhesive bonding between each of the layers, or connected by means of screws, nuts or rivets after the cascade. An object is placed on the surface layer to be heated or contacting to be heated, and thus the surface layer can conduct heat. The thermally conductive insulating layer, on the one hand, needs to serve as the thermal conductivity, so that the heat emitted by the heating film can be transferred to the surface layer for heating the object. On the other hand, it serves for insulation, so as to avoid the current in the heating film from being transferred to the surface layer, thus preventing the human body from being electrocuted during the use of the heating structure. The heating film is capable of generating heat by means of electric heating, and the heat generated is transmitted to the surface layer through the heat-conducting insulating layer. The thermal insulation layer can play the role of thermal insulation, so that the heat generated by the heating film will not be transmitted to the bottom surface of the heating structure, and to ensure that the heat is transmitted to the surface layer, on the other hand, the thermal insulation layer can play the role of insulation, which ensures that the electric current generated by the heating film will not be transmitted to the side of the insulating insulation layer, thus avoiding the risk of human electrocution.

Further, the mentioned heat generating film comprises a conductive layer, and conductive members disposed at two ends of an upper surface of the mentioned conductive layer. The heating film is connected to an external current through the conductive member, which is then transferred to the conductive layer. The conductive layer passes through the current and generates heat, which is then transferred to the surface layer through the thermally conductive insulating layer.

The heating structure of the utility model comprises a surface layer, a heat-conducting insulating layer, a heat-emitting film, and a heat-insulating insulating layer sequentially stacked and connected, which has the advantages of high heating temperature and desirable heating uniformity. It can be connected to a large range of voltages and adjustable regarding heating temperature, both thin and small in volume.

Further, the mentioned surface layer comprises one of a metal layer, a tempered ceramic layer, a glass layer, and a rock plate layer. The mentioned metal layer, tempered ceramic layer, glass layer, and rock plate layer all have good heat and are capable of using the received heat to heat the object.

Further, the mentioned thermally conductive insulating layer comprises one of a mica film, a quartz film, a boron nitride film, a boron nitride coating, a Teflon paper, a thermally conductive silicone layer, and a thermally conductive silicone grease layer. Wherein the mentioned mica film, quartz film, Teflon paper, thermally conductive silicone layer, and thermally conductive silicone grease layer have desirable thermal conductivity and good insulating properties, and thus are capable of transmitting the heat generated by the heat generating film to the surface layer, and at the same time insulating the electric current of the heat generating film from transmitting to the surface layer, thereby avoiding the risk of electric shock to the human body.

Further, the mentioned heat generating film further comprises an insulating layer, which is disposed on a lower surface of the mentioned conductive layer in a cascade sequence; wherein the heat generating film comprises the conductive layer and the insulating layer that belongs to a double-layer structure. The insulating layer is capable of strengthening the insulating property of the heat insulating side.

Further, the mentioned conductive layer comprises a polymer substrate, and a conductive substance dispersed in the mentioned polymer substrate; wherein the polymer substrate comprises polyimide, which has high temperature resistance and facilitates dispersal of the conductive substance, so that the conductive effect of the entire conductive layer is desirable.

Further, the mentioned conductive substance comprises carbon nanotubes, graphene or conductive carbon black. The mentioned carbon nanotubes, graphene or conductive carbon black are better in dispersion and conductive properties.

Further, the mentioned thermal insulating layer comprises one of a thermal insulating silicone, a thermal insulating component; wherein the thermal insulating silicone has better thermal insulating properties and insulating properties.

Further, the mentioned heat-insulating component comprises a plastic plate and an aerogel block, the mentioned plastic plate being provided with a recess, the mentioned aerogel block being set in the mentioned recess; wherein the aerogel block has good heat-insulating effect, and the plastic plate has desirable insulating properties. The plastic plate comprises a polytetrafluoroethylene plate.

Further, a side of the mentioned thermal insulation assembly on which the mentioned aerogel block is located is in contact with the mentioned heating membrane. Wherein the aerogel block is in contact with the heat generating membrane to be able to insulate the heat generated by the heat generating membrane from outwardly transferring in the direction of the heat insulating layer.

Further, the mentioned electrically conductive member comprises two metal strips disposed at two end portions of an upper surface of said electrically conductive layer; the metal strips comprise copper strips, silver strips, and aluminum strips. The metal strips are used for transferring electric current, which are directly attached to the surface of the conductive layer, capable of transferring electric current from the metal strips to the conductive layer. Wherein, the mentioned conductive member also includes two wires welded to the two mentioned metal strips respectively, and a plug connected to the two wires respectively. The plugs are directly connected to a power source, and then the current is transferred to the metal strips through the wires.

Or, further, the mentioned conductive member comprises silver paste conductive strips or carbon paste conductive strips disposed at two end portions of the upper surface of the mentioned conductive layer, and two metal strips disposed on the upper surface of the mentioned silver paste conductive strips or carbon paste conductive strips; the silver paste conductive strips or carbon paste conductive strips are formed into a stabilized coating structure by printing the silver paste or carbon paste onto the conductive layer and then drying it. The mentioned conductive member further comprises two wires, respectively, welded to the two metal strips, and a plug connected to the two wires, respectively. The plug is used for directly to the power supply, and then the current is passed through the wire to the metal strip, and then passed from the metal strip to the silver paste conductive strip or carbon paste conductive strip. In the conductive layer of the upper surface of the first printed silver paste conductive strip or carbon paste conductive strip, can make the silver paste or carbon paste formed by the conductive paste coating with the conductive layer of polymer substrate tightly adheres to the formation of a firm combination of continuous electrodes. The electrodes formed of the silver paste conductive strip or carbon paste conductive strip are flexible and can be curled with the flexible conductive layer. However, the resistance of the silver paste conductive strip or the carbon paste conductive strip is relatively high over long distances, and there is a possibility of temperature difference and unevenness problems, so that a very low resistance metal strip is provided on the upper surface of the silver paste conductive strip or the carbon paste conductive strip. It is able to compensate for the voltage loss of the silver paste conductive strip or the carbon paste conductive strip, and solve the problems of temperature difference and unevenness, and at the same time make it more convenient to further connect the external wires through the metal strip compared to such conductive coatings formed by the silver paste or the carbon paste of the silver paste or the carbon paste conductive strip.

Further, the mentioned metal strip is provided with a plurality of bumps, the mentioned bumps being in contact with the mentioned silver paste conductive strip or carbon paste conductive strip; the provision of a plurality of bumps is able to enhance the metal strip being in contact with the silver paste conductive strip or carbon paste conductive strip. In addition, the surface of the bumps touching the silver paste conductive strip or the carbon paste conductive strip is a circular arc-shaped surface, which can enhance the transmission of electric current, and can avoid piercing the silver paste conductive strip or the carbon paste conductive strip, and in addition the friction between the conductive layer and the metal strip is increased by the provision of the bumps, so that the connection between the conductive layer and the metal strip is more solid, and meets the solid connection of the end-products in a variety of conditions of use.

Further, the mentioned plurality of bumps are equally spaced apart. The spacing between the plurality of bumps is the same, which can ensure the uniformity of current transmission.

Further, the mentioned spacing between the mentioned plurality of bumps is from 2 cm to 5 cm. The spacing is more suitable for uniform current transfer.

Further, the thickness of the mentioned heat generating film is 0.02 mm-1 mm; wherein the thickness of the heat generating film ensures both good conductive heat generating performance and softness of the heat generating film, which facilitates processing.

Further, the mentioned thermally conductive insulating layer has a thickness of 0.01 mm to 2 mm. The thickness of the thermally conductive insulating layer ensures both good thermal conductivity and insulating properties, and relatively good processing operability.

Further, a sealing barrier member for sealing the mentioned heat generating film and heat insulating layer is provided between the mentioned surface layer and heat insulating layer. The sealing barrier member enables the entire heating structure to be highly waterproof and insulating.

Further, the mentioned sealing barrier member comprises one of a rubber ring, a silicone ring, a plastic rubber ring, or a waterproof adhesive coating. The rubber ring, the silicone ring, the plastic adhesive ring or the waterproof adhesive coating can achieve a good sealing effect, which in turn makes the whole heating structure have good waterproof and insulating properties.

In order to realize the second object of the above utility model, the technical solutions adopted in the utility model are as follows:

The present utility model provides a heating device comprising a heating structure as described above. The heating device may be a grill pan, an electric fondue pot, an iron, an electric heater, an industrial oven or a tunnel oven. The heating device has the advantages of good heating uniformity, wide range of access voltage, thin thickness and small size compared to the conventional heating device.

Compared with the prior art, the beneficial effect of the utility model is as follows:

(1) a heating structure of the utility model comprises a surface layer, a heat-conducting insulating layer, a heating film, and a heat-insulating insulating layer sequentially stacked and connected, and the heating film comprises a conductive layer, and a conductive member disposed at the ends of the upper surface of the conductive layer, and the heating film and the surface layer, the heat-conducting insulating layer, and the heat-insulating insulating layer are set up such that the heating structure has a high heating temperature, and the uniformity of heating is good, and can access a wide range of voltage, and can adjust the heating temperature, and the heating temperature can reach up to 350V, and an adjustable heating temperature, with a maximum heating temperature of 350° C. In addition, the heating structure has a higher heating temperature than the conventional heating structure. In addition, the heating structure also has the advantages of thin thickness and small volume.

(2) A heating structure of the utility model, due to the provision of a sealing barrier member for sealing the heat generating film and the heat insulating layer between the surface layer and the heat insulating layer, is able to make the whole heating structure have good waterproof and insulating properties, has a simple structure, has a high productivity, has a low cost of production, and can be suitable for the characteristics of mass production. In addition, the heating structure can be applied to a baking pan, an electric fondue pot, an iron, an electric heater, an industrial oven heating component or a tunnel oven heating component.

(3) A heating device of the utility model comprising a heating structure of the present invention. The heating device may be a grill pan, an electric fondue pot, an iron, an electric heater, an industrial oven or a tunnel oven. The heating device has the advantages of good heating uniformity, wide range of access voltage, thin thickness and small size relative to the conventional heating device.

BRIEF DESCRIPTION OF DRAWINGS

In order to more clearly illustrate the technical solutions in the examples of the utility model, the following will briefly introduce the accompanying drawings that need to be used in the description of the examples or the prior art, and it is obvious that the accompanying drawings in the following description are only some of the examples of the utility model, and for the technician in the field, under the premise of not exerting creative labor, it is possible to obtain other drawings according to these drawings.

The accompanying drawings.

Figure 1:
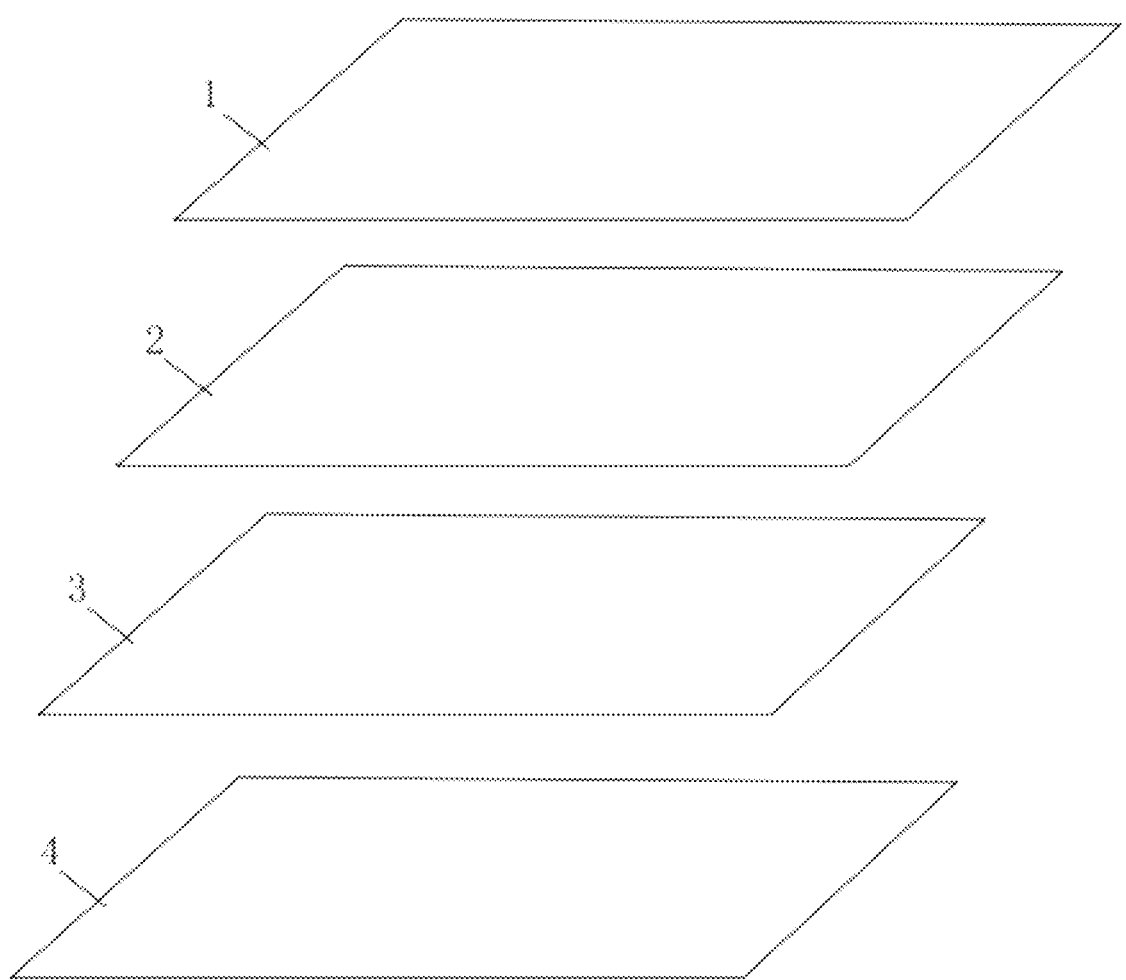
FIG. 1 is a schematic diagram of a decomposed structure of a heating structure of Example 1 of the present utility model.

In the Figure: surface layer 1; heat-conducting insulating layer 2; heat-emitting film 3;

heat-insulating insulating layer 4; electrically conductive layer 31; metal strip 32; wire 33; plug 34; insulating layer 35; silver paste conductive strip or carbon paste conductive strip 36; bumps 37; plastic plate 41; aerogel block 42.

DETAILED DESCRIPTION OF THE EMBODIMENTS

To make clearer of the technical problems, technical solutions and beneficial effects to be solved by the present utility model, the present utility model is described in further detail below using examples. It should be understood that the specific examples described herein are only for explaining the present utility model and are not intended to limit the present utility model.

Terms used in the examples of the utility model are used solely for the purpose of describing particular examples and are not intended to limit the utility model. In the present invention, the singular forms of "a", "the mentioned" and "the" used in the examples and the attached Claims are also intended to include plural forms, unless the context clearly indicates other meanings.

The following is illustrated in connection with specific examples.

Example 1

Figure 2:
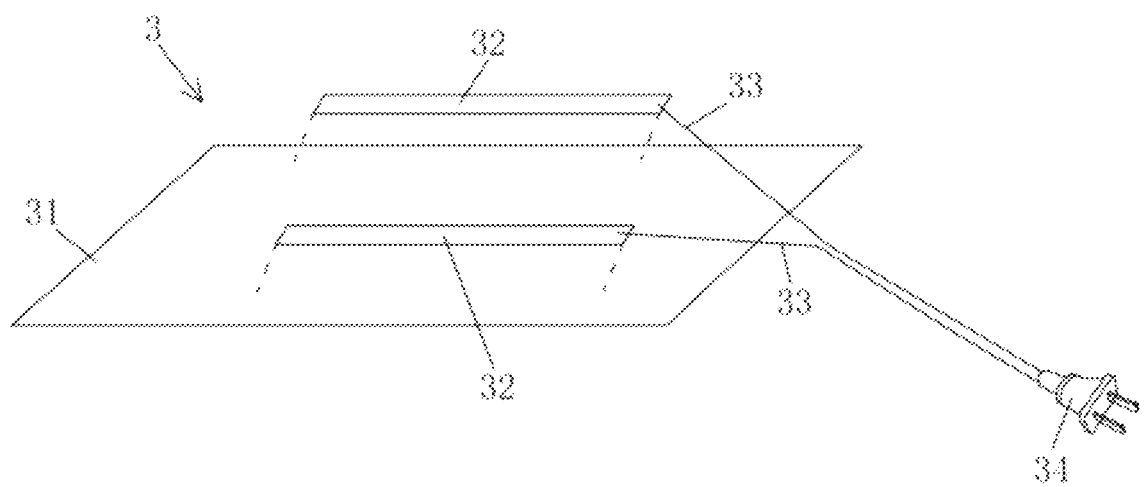
FIG. 2 is a schematic diagram of a disassembled structure of a heating membrane of Example 1 of the present utility model.

A heating structure of the present example, as shown in FIG. 1 and FIG. 2, comprises a surface layer 1, a thermally conductive insulating layer 2, a heat generating film 3, and a heat insulating layer 4 connected in a sequential cascade; the surface layer 1, the thermally conductive insulating layer 2, the heat generating film 3, and the heat insulating layer 4 are connected either by adhesive connection between each of the layers or by means of screws, nuts, or rivets with the four layers stacked in a cascade. An object can be placed on top of the surface layer 1 to be heated or for contacting, and therefore the surface layer 1 is a surface layer 1 that can conduct heat. The thermal insulation layer 2, on the one hand, needs to act as a heat conductor, and thus transfer the heat emitted by the heat generating film 3 to the surface layer 1 to be used to heat the object. On the other hand, it needs to work for insulation, so as to prevent the electric current in the heating film 3 from being transferred to the surface layer 1, thus avoiding the risk of electric shock to the human body during the use of the heating structure. The heating film 3 can generate heat by means of electric heating, and the heat generated is transmitted to the surface layer 1 through the heat-conducting insulating layer 2. The heat-insulating insulating layer 4, on the one hand, can work for heat insulation, so that the heat generated by the heating film 3 will not be transmitted to the bottom surface of the heating structure. It ensures that the heat is transmitted to the surface layer 1. The heat-insulating insulating layer 4, on the other hand, can play the role of insulation and ensure that the electric current generated by the heating film 3 will not be transmitted to the bottom of the heating structure, but to the surface layer 1, instead. The heat insulating layer 4 can play the role of insulation, which in turn ensures that the electric current generated by the heat generating film 3 will not be transmitted to the side of the heat insulating layer 4, which prevents the risk of electric shock to the human body.

In this example, the heat generating film 3 comprises a conductive layer 31, and conductive members disposed at two ends of the upper surface of the conductive layer 31. Wherein, the heat generating film 3 is connected to an external electric current through the conductive member, which is then transferred to the conductive layer 31. After the electric current pass through the conductive layer 31, it generates heat that is transferred to the surface layer 1 through the thermally conductive insulating layer 2.

In this example, as shown in FIG. 2, the conductive member comprises two metal strips 32 disposed at the ends of the upper surface of the conductive layer 31; furthermore, the conductive member comprises two wires 33 welded to the two metal strips 32, and a plug 34 connected to the two wires 33.

The metal strips 32 may be copper strips, silver strips or aluminum strips. Copper strips are more commonly used because of their lower cost and lower resistance, as well as the advantage that they are not easily oxidized. The metal strip 32 is used to transfer current, which is directly attached to the surface of the conductive layer 31, transferring the current from the metal strip 32 to the conductive layer 31. The plug 34 is used to directly connect to the power supply, and then the current is transferred to the metal strip 32 through the wire 33.

In this example, the conductive layer 31 comprises a polymer substrate, and a conductive substance dispersed in the polymer substrate; wherein the polymer substrate is suitable for dispersing the conductive substance, and in this example, the polymer substrate is selected from polyimide, which is resistant to high temperatures and facilitates dispersing the conductive substance, so as to ensure the desirable conductive performance of entire conductive layer 31.

In this example, the electrically conductive substance may be one or a combination of one or more of carbon nanotubes, graphene, or electrically conductive carbon black. Among them, the carbon nanotubes, graphene or conductive carbon black have better dispersion and conductive properties.

In this example, the surface layer 1 may be one of a metal layer, a tempered ceramic layer, a glass layer, a rock plate layer. Among them, the metal layer, the tempered ceramic layer, the glass layer, and the rock plate layer all have good heat receiving properties, and are capable of using the received heat to heat the object.

In this example, the thermally conductive insulating layer 2 may be one of a mica film, a quartz film, a boron nitride film, a boron nitride coating, a Teflon paper, a thermally conductive silicone layer, and a thermally conductive silicone grease layer. Among them, the mica film, the quartz film, the Teflon paper, the thermally conductive silicone layer, and the thermally conductive silicone grease layer have good thermal conductivity and insulating properties, and thus able to transfer the heat generated by the heat generating film 3 to the surface layer 1, and at the same time prevent the electric current of the heat generating film 3 from being transmitted to the surface layer 1. Therefore, it prevents the risk of electric shock to the human body.

In this example, the heat-insulating insulating layer 4 is heat-insulating silica gel; wherein the heat-insulating silica gel is better in heat-insulating and electric insulating.

In this example, the thickness of the heat generating film 3 ranges from 0.02 mm to 1 mm; which ensures both good conductive heat generating performance and softness of the heat generating film 3, thus facilitating the processing.

In this example, the thickness of the thermally conductive insulating layer 2 ranges from 0.01 mm to 2 mm, which ensures both good thermal conductivity and insulation, and good processing operability.

Example 2

Figure 3:
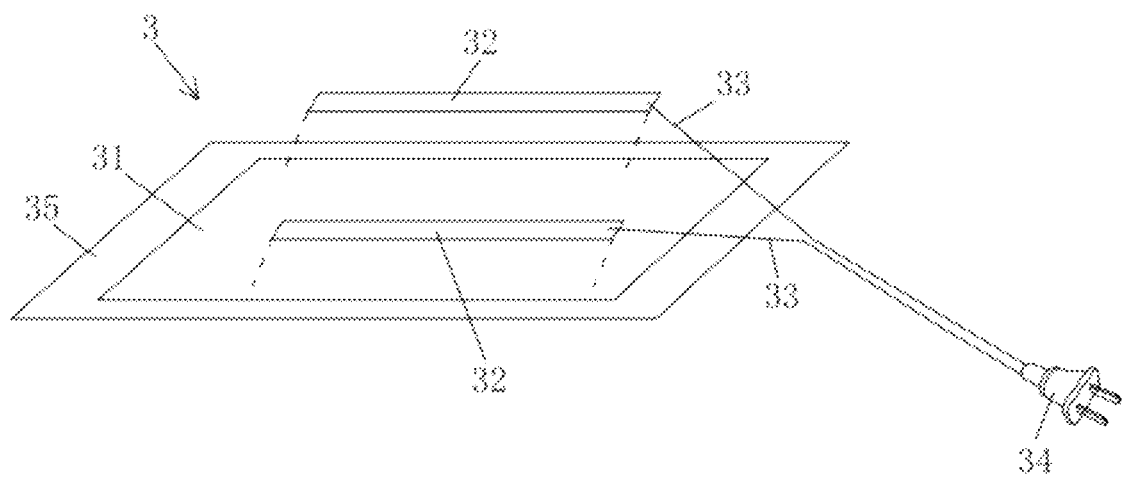
FIG. 3 is a schematic diagram of a decomposed structure of a heating membrane of Example 2 of the present utility model.

As for the heating structure in the present example, as shown in FIG. 3, the present example differs from Example 1 in that the heat generating film 3 comprises an insulating layer 35 that is set on a lower surface of the conductive layer 31 in a cascaded sequence. The heat generating film 3 is a double-layer structure, comprising the conductive layer 31 and the insulating layer 35, which is able to strengthen the insulating property of the side of the heat insulating layer 4. The rest of the technical solutions in this example are the same as that of Example 1.

Example 3

Figure 4:
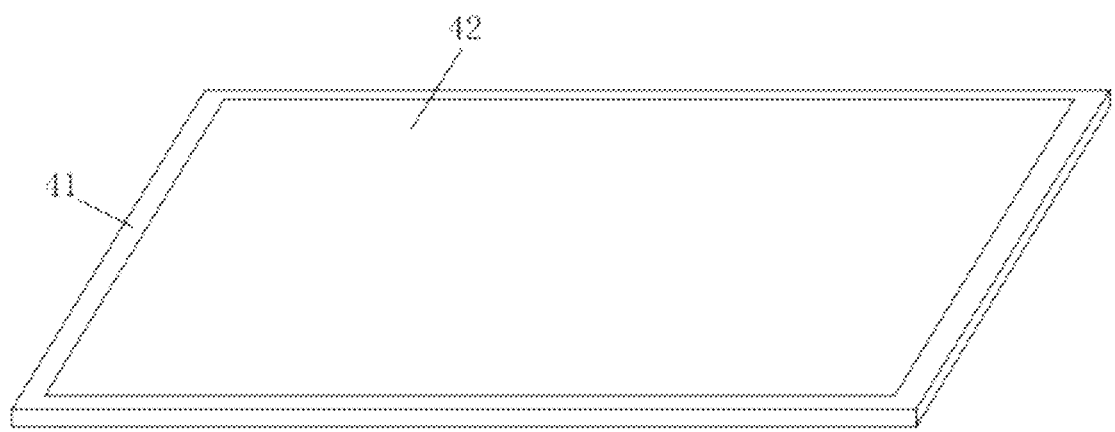
FIG. 4 is a schematic diagram of the structure of the heat-insulating insulating layer of Example 3 of the present utility model.

As for the heating structure of the present example, as shown in FIG. 4, the present example differs from Example 1 in that the heat-insulating and electric insulating layer 4 is a heat-insulating assembly, comprising a plastic plate 41 and an aerogel block 42. The plastic plate 41 is provided with a recess, and the aerogel block 42 is disposed in the recess; wherein a side of the heat-insulating assembly where the aerogel block 42 is disposed is touched to the heat-emitting film 3. Wherein, the aerogel block 42 is in contact with the heat generating film 3, insulating the heat generated by the heat generating film 3 from outwardly transferring in the direction of the heat-insulating and electric insulating layer 4. The rest of the technical solutions of this example are the same as that of Example 1.

Example 4

Figure 5:
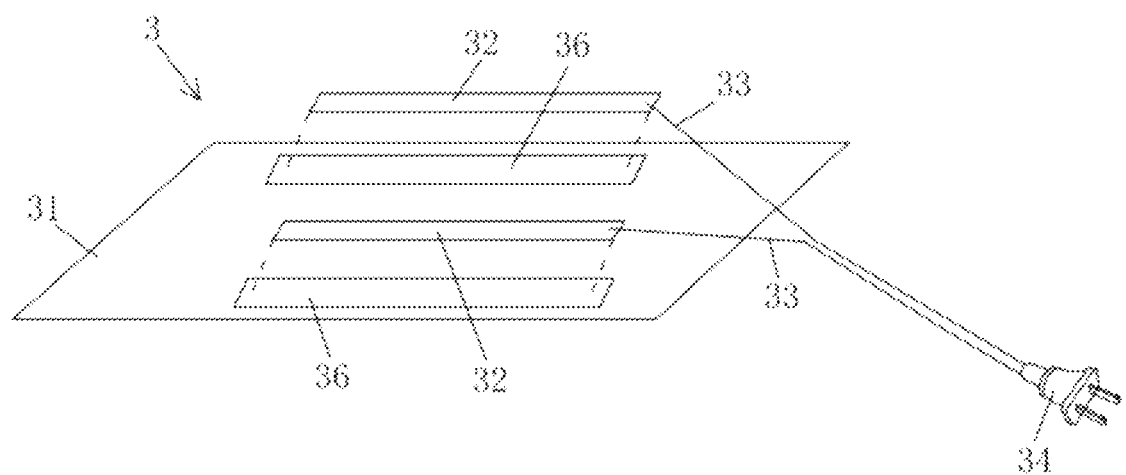
FIG. 5 is a schematic diagram of the disassembled structure of the heat generating film of Example 4 of the present utility model.

A heating structure of the present example, as shown in FIG. 5, differs from Example 1 in that the electrically conductive member comprises silver paste conductive strips or carbon paste conductive strips 36 disposed at two ends of the upper surface of the electrically conductive layer 31, and two metal strips 32 disposed on the upper surface of the silver paste conductive strips or carbon paste conductive strips 36; wherein the silver paste conductive strips or the carbon paste conductive strips 36 are stable coating structure formed by printing the silver paste or the carbon paste onto the electrically conductive layer 31 and then drying. The conductive member further includes two wires 33 welded to the two metal strips 32, and a plug 34 connected to the two wires 33, wherein the plug 34 is used to be directly connected to a power source. Then the current is transferred to the metal strips 32 through the wires 33, and from the metal strips 32 to the silver-paste conductive strips or the carbon-paste conductive strips 36. Wherein, the silver paste conductive strip or the carbon paste conductive strip 36 is printed firstly on the upper surface of the conductive layer 31, to make the conductive paste coating formed by the silver paste or the carbon paste fit closely with the conductive layer 31 of the polymer substrate to form a continuous electrode with a stronger bonding force. As such electrodes of the formed silver paste conductive strip or the carbon paste conductive strip 36 are flexible and can be curled or bent together with the flexible conductive layer 31, however, the silver paste conductive strip or carbon paste conductive strip 36 has a relatively high resistance over a long distance, and they may be temperature difference and unevenness. Therefore, a very low resistance metal strip 32 is provided on the upper surface of the silver paste conductive strip or carbon paste conductive strip 36, which is able to compensate for the voltage loss of the silver paste conductive strip or the carbon paste conductive strip 36, and to reduce temperature difference and unevenness. At the same time, in comparison to the silver paste or the carbon paste formed by the silver paste or the carbon paste conductive strip 36 of such conductive coating, it is more convenient to further connect the external conductor 33 through the metal strip 32. The rest of the technical solutions of this example are the same as that of Example 1.

Example 5

Figure 6:
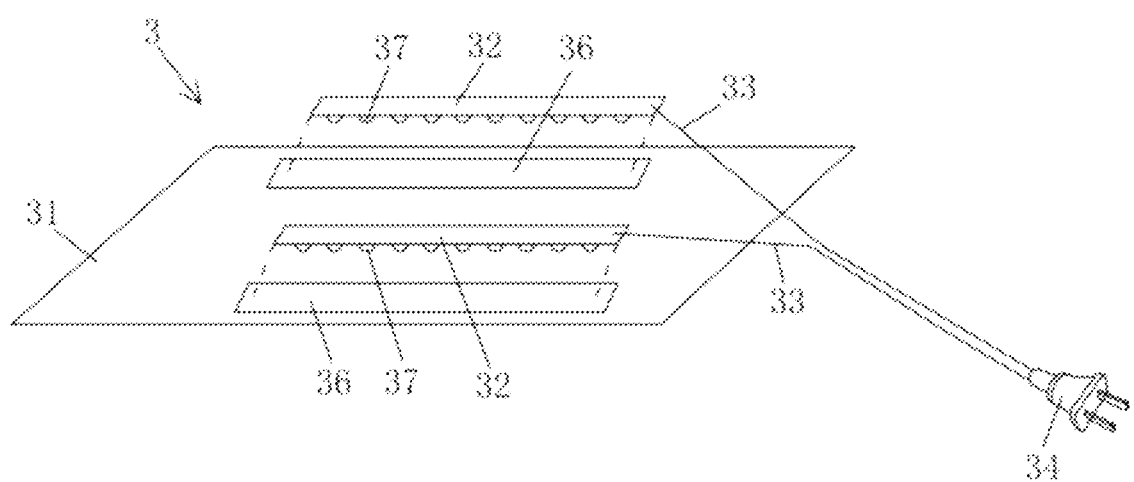
FIG. 6 is a schematic diagram of the decomposed structure of the heat generating membrane of Example 5 of the utility model.

The heating structure of this example, shown in FIG. 6, differs from example 4 in that the metal strip 32 is provided with a plurality of bumps 37 that are in contact with the silver paste conductive strips or the carbon paste conductive strips 36; wherein the provision of a plurality of bumps 37 is able to enhance the contact of the metal strip 32 with the silver paste conductive strips or the carbon paste conductive strips 36. In addition, the contact surface between bump 37 and the silver paste conductive strip or carbon paste conductive strip 36 contact surface is arc-shaped surface, which can enhance the transmission of current, but also avoid breaking the silver paste conductive strip or carbon paste conductive strip 36. In addition, the setup of the bump 37 also increases the friction between the conductive layer 31 and the metal strip 32, making the connection between the conductive layer 31 and the metal strip 32 more stable. Such connection can be ensured stable in the end product under a variety of using conditions. In this embodiment, the interval between the several bumps 37 ranges from 2 cm to 5 cm, which is more suitable for the uniform transmission of current. The rest of the technical solutions of this example are the same as example 4.

Example 6

A heating structure of the present example differs from embodiment 1 in that a sealing barrier member for sealing the heat generating film 3 and the heat-insulating and electric insulating layer 2 is provided between the surface layer 1 and the heat-insulating and electric insulating layer 4. Therein, the sealing barrier member can enable the entire heating structure to be desirably waterproofing and insulating. In this example, the sealing barrier member may be one of a rubber ring, a silicone ring, a plastic rubber ring, or a waterproof adhesive coating. Among them, the rubber ring, the silicone ring, the plastic adhesive ring or the waterproof adhesive coating can achieve a good sealing effect, which in turn ensure the entire heating structure to be waterproofing and insulating. The rest of the technical solutions of this example are the same as that of Example 1.

Example 7

A heating device of this example comprises a heating structure of the present invention. The heating device can be used as a grill pan, an electric fondue pot, an iron, an electric heater, an industrial oven or a tunnel oven. The heating device has the advantages of good heat generation uniformity, connecting to wide range of voltages, being thin and small in volume, compared to the conventional heating device.

The mentioned is only a preferred example of the present application, and is not intended to limit the present application. Any modifications, equivalent substitutions, improvements, etc. made within the principles of the present application shall be included in the scope of protection of the present application.

What is claimed is:

1. A heating structure comprising a surface layer, a thermally conductive and electrically insulating layer, a heat-generating film, and a heat-insulating layer that are connected in a sequential cascade;
   wherein the heat generating film comprises a conductive layer, and conductive members disposed at two end portions of an upper surface of the conductive layer;
   wherein the thermally conductive and electrically insulating layer comprises one selected from the group consisting of a mica film, a quartz film, a boron nitride film, a boron nitride coating, a Teflon paper, a thermally conductive silicone layer, and a thermally conductive silicone grease layer.

2. The heating structure of claim 1, wherein the surface layer comprises one selected from the group consisting of a metal layer, a tempered ceramic layer, a glass layer, and a rock plate layer.

3. The heating structure of claim 1, wherein the heat generating film further comprises an insulating layer, disposed sequentially on a lower surface of the conductive layer;
   wherein the conductive layer comprises a polymer substrate, and a conductive substance dispersed in the polymer substrate; wherein the mentioned conductive substance comprises carbon nanotubes, graphene, or conductive carbon black.

4. The heating structure of claim 1, wherein the heat insulating layer comprises one selected from the group consisting of a heat insulating silicone, a heat insulating assembly;
   wherein the heat insulating assembly comprises a plastic plate and an aerogel block, wherein there is defined a lot in the plastic plate, and wherein the aerogel block is disposed in the slot;
   wherein a side of the heat-insulating assembly where the mentioned aerogel block is located is in contact with the heat-emitting film.

5. The heating structure of claim 4, wherein the plastic plate is substantially rectangular-shaped, and wherein the slot is also substantially rectangular shaped, thus forming a substantially rectangular-annular shape, and wherein the aerogel block is disposed in the slot.

6. The heating structure of claim 1, wherein the electrically conductive member comprises two metal strips disposed at two end portions of the upper surface of the mentioned electrically conductive layer;
   wherein the conductive member further comprises two wires welded respectively to the mentioned metal strips, and a plug connected respectively to the two wires.

7. The heating structure of claim 1, wherein the conductive member comprises silver paste conductive strips or carbon paste conductive strips disposed at two end portions of an upper surface of the conductive layer, and wherein the two metal strips disposed at an upper surface of the silver paste conductive strips or carbon paste conductive strips;
   wherein the conductive member further comprises two wires respectively soldered to the two metal strips, and a plug respectively connected to the two wires.

8. The heating structure of claim 7, wherein the metal strip comprises a plurality of protrusions, which are in contact with the silver paste conductive strip or carbon paste conductive strip;
   wherein a spacing between the plurality of protrusions is even; wherein the spacing between the plurality of protrusions is from 2 cm to 5 cm.

9. The heating structure of claim 1, wherein a thickness of the heat generating film lies in the range from 0.02 mm to 1 mm; wherein a thickness of the thermally conductive and electrically insulating layer lies in the range from 0.01 mm to 2 mm.

10. The heating structure of claim 1, wherein a sealing barrier member for sealing the heat generating film and the heat conducting insulating layer is arranged between the surface layer and the heat conducting insulating layer;
  wherein the sealing barrier member comprises one selected from the group consisting of a rubber ring, a silicone ring, a plastic adhesive ring, and a waterproof adhesive coating.

11. A heating apparatus, comprising a heating structure, the heating structure comprising a surface layer, a thermally conductive and electrically insulating layer, a heat-generating film, and a heat-insulating layer that are connected in a sequential cascade;
  wherein the heat generating film comprises a conductive layer, and conductive members disposed at two ends portions of an upper surface of the conductive layer;
  wherein the thermally conductive and electrically insulating layer comprises one selected from the group consisting of a mica film, a quartz film, a boron nitride film, a boron nitride coating, a Teflon paper, a thermally conductive silicone layer, and a thermally conductive silicone grease layer.

* * * * *